United States Patent
Sawa

(10) Patent No.: US 7,101,638 B2
(45) Date of Patent: Sep. 5, 2006

(54) IONIC CONDUCTIVE SOLID ELECTROLYTE, METHOD OF MANUFACTURING THE SAME AND ELECTROCHEMICAL SYSTEM USING THE SAME

(75) Inventor: Haruo Sawa, Kochi-ken (JP)

(73) Assignee: Nippon Kodoshi Corporation, Kochi-ken (JP)

( * ) Notice: Subject to any disclaimer, the term of this patent is extended or adjusted under 35 U.S.C. 154(b) by 298 days.

(21) Appl. No.: 10/263,958

(22) Filed: Oct. 4, 2002

(65) Prior Publication Data

US 2003/0082459 A1 May 1, 2003

(30) Foreign Application Priority Data

Oct. 31, 2001 (JP) ............................. 2001-335314

(51) Int. Cl.
*H01M 8/10* (2006.01)
(52) U.S. Cl. .......................................... 429/33; 429/317
(58) Field of Classification Search ................ 429/317, 429/33
See application file for complete search history.

(56) References Cited

U.S. PATENT DOCUMENTS

| | | | |
|---|---|---|---|
| 4,448,493 A | 5/1984 | Matsudaira et al. | |
| 4,734,344 A | 3/1988 | Choi | |
| 5,298,348 A | 3/1994 | Kung | |
| 5,389,471 A | 2/1995 | Kung | |

OTHER PUBLICATIONS

Yamada et al., "Oxygen-utilization Performance of Trick-bed Cathode for On-site Electrochemical Production of Hydrogen Peroxide", Electrochemistry, pp. 154-159.
Notsu et al., "Test of Novel Air Conditioner by Solid-Polymer Dehumidifying Cell",2000 IEEE Japan, pp. 3373-3374, Not in English.
Petty-Weeks et al., "Differential Scanning Calorimetry and Complex Admittance Analysis of $PVA/H_3PO_4$ Proton Conducting Polymer Blends", Sensors and Actuators, 11(1987) pp. 377-386, Elsevier Sequoia/Printed in The Netherlands.
Kuwabara et al., "On Solid-State ECD, $WO_3$/Solid Electrolyte/Metal", Bull.Chem.Soc.Jpn., 60 pp. 747-752, 1987 The Chemical Society of Japan.
Notten et al., "Optical Switching of Y-Hydride Thin Film Electrodes—A Remarkable Electrochromic Phenomenon", J. Electrochem.Soc.,vol. 143,No. 10, Oct. 1996, pp. 3348-3353.
Nogami et al., "Fast Protonic Conductors of Water-Containing PO-ZrO-SiO Glasses", J.Electrochem.Soc., vol. 144, No. 6, Jun. 1997, pp. 2175-2178.
Nakamura et al., "High-Conductivity Solid Proton Conductors: Dodecamolybdophosphoric Acid and Dodecatungstophosphoric Acid Crystals", Chemistry Letters, pp. 17-18, 1979, Pub. by Chemical Society of Japan.
Yong-Ming Li et al., "Proton Conductivity of Some Hydrated Compounds at Intermediate Temperature up to 150C under High Water Vapor Pressure", Electrochemistry, 69, No. 1(2001), pp. 2-5.
Chiaki Iwakura et al., "Nickel/Metal Hydride Cells Using an Alkaline Polymer Gel Electrolyte Based on Potassium Salt of Crosslinked Poly(acrylic acid)", Electrochemistry, 69, No. 9(2001). pp. 659-663.

*Primary Examiner*—Laura Weiner
(74) *Attorney, Agent, or Firm*—Shlesinger, Arkwright & Garvey LLP

(57) ABSTRACT

An object of the present invention is to provide a low cost and highly ionic conductive solid electrolyte which is an organic-inorganic composite compound and is water-absorbing as well as water-resistive. Another object of the present invention is to provide electrochemical systems utilizing the above-mentioned electrolyte. The solid electrolyte of the present invention is a composite compound comprising tungstic and/or molybdic acid compound and polyvinylalcohol (PVA), and containing water. Tungstate and/or molybdate and other salt are neutralized by an acid in the aqueous solution dissolving PVA. Then, the water as the solvent of the aqueous solution is removed, and then the unnecessary salts are removed, thereby obtaining the composite compound.

17 Claims, 2 Drawing Sheets

FIG. 1

IONIC CONDUCTIVITY OF COMPOSITE CIOMPOUND

| sample No. | converted wt.% r of W or Mo l relative to PVA | converted wt.% of P relative to PVA | converted wt.% of Si relative to PVA | converted wt.% of B relative to PVA | ionic conductivity (Siemens/cm) |
|---|---|---|---|---|---|
| 1 | 0.09 (W) | — | — | — | $5.7 \times 10^{-6}$ |
| 2 | 0.36 (W) | — | — | — | $5.8 \times 10^{-5}$ |
| 3 | 0.54 (W) | — | — | — | $2.9 \times 10^{-5}$ |
| 4 | 0.72 (W) | — | — | — | $4.3 \times 10^{-5}$ |
| 5 | 0.009 (W) | 0.070 | — | — | $2.0 \times 10^{-6}$ |
| 6 | 0.18 (W) | 0.070 | — | — | $9.5 \times 10^{-5}$ |
| 7 | 0.36 (W) | 0.105 | — | — | $1.6 \times 10^{-4}$ |
| 8 | 0.54 (W) | 0.003 | | — | $4.5 \times 10^{-5}$ |
| 9 | 0.54 (W) | 0.035 | — | — | $8.9 \times 10^{-5}$ |
| 10 | 0.54 (W) | 0.070 | — | — | $9.2 \times 10^{-5}$ |
| 11 | 0.18 (W) | — | 0.065 | — | $1.7 \times 10^{-5}$ |
| 12 | 0.54 (W) | — | 0.016 | — | $2.9 \times 10^{-5}$ |
| 13 | 0.54 (W) | — | 0.033 | — | $1.4 \times 10^{-5}$ |
| 14 | 0.009 (W) | 0.070 | 0.033 | — | $1.4 \times 10^{-6}$ |
| 15 | 0.09 (W) | 0.070 | 0.032 | — | $2.4 \times 10^{-5}$ |
| 16 | 0.18 (W) | 0.070 | 0.032 | — | $4.1 \times 10^{-5}$ |
| 17 | 0.20 (W) | — | — | 0.034 | $5.9 \times 10^{-5}$ |
| 18 | 0.36 (W) | — | — | 0.001 | $7.0 \times 10^{-5}$ |
| 19 | 0.36 (W) | — | — | 0.017 | $1.6 \times 10^{-4}$ |
| 20 | 0.005 (M) | — | — | — | $5.0 \times 10^{-7}$ |
| 21 | 0.05 (M) | — | — | — | $2.7 \times 10^{-6}$ |
| 22 | 0.16 (M) | — | — | — | $3.2 \times 10^{-6}$ |
| 23 | 0.16 (M) | 0.070 | — | — | $1.3 \times 10^{-5}$ |
| 24 | 0.16 (M) | — | 0.065 | — | $1.2 \times 10^{-5}$ |
| 25 | 0.16 (M) | — | — | 0.034 | $4.8 \times 10^{-6}$ |
| 26 | 0.05 (M) | 0.070 | 0.065 | — | $2.0 \times 10^{-5}$ |
| 27 | 0.16 (M) | 0.105 | 0.065 | — | $3.6 \times 10^{-5}$ |

(W) : tungstic acid compound
(M) : molybdic acid compound

FIG. 2 IONIC CONDUCTIVITY OF COMPOSITE COMPOUND DIPPED IN ACID OR ALKALINE SOLUTION

| sample No. | converted wt.% of W or Mo relative to PVA | converted wt.% of P relative to PVA | converted wt.% of Si relative to PVA | converted wt.% of B relative to PVA | ionic conductivity (Siemens/cm) |
|---|---|---|---|---|---|
| 28 | 0.091 (W) | — | — | — | (C) $1.6 \times 10^{-5}$ |
| 29 | 0.36 (W) | — | — | — | (C) $1.2 \times 10^{-4}$ |
| 30 | 0.54 (W) | — | — | — | (C) $1.9 \times 10^{-4}$ |
| 31 | 0.72 (W) | — | — | — | (C) $1.5 \times 10^{-4}$ |
| 32 | 0.009 (W) | 0.070 | — | — | (C) $6.1 \times 10^{-6}$ |
| 33 | 0.18 (W) | 0.070 | — | — | (C) $1.8 \times 10^{-4}$ |
| 34 | 0.36 (W) | 0.105 | — | — | (C) $2.9 \times 10^{-4}$ |
| 35 | 0.54 (W) | 0.003 | | | (C) $3.0 \times 10^{-4}$ |
| 36 | 0.54 (W) | 0.035 | — | — | (C) $3.7 \times 10^{-4}$ |
| 37 | 0.54 (W) | 0.035 | — | — | (P) $1.8 \times 10^{-4}$ |
| 38 | 0.54 (W) | 0.070 | — | — | (C) $4.1 \times 10^{-4}$ |
| 39 | 0.18 (W) | — | 0.065 | — | * $1.5 \times 10^{-6}$ |
| 40 | 0.54 (W) | — | 0.016 | — | (C) $2.0 \times 10^{-4}$ |
| 41 | 0.54 (W) | — | 0.016 | — | * $1.4 \times 10^{-6}$ |
| 42 | 0.54 (W) | — | 0.033 | — | (C) $1.5 \times 10^{-4}$ |
| 43 | 0.009 (W) | 0.070 | 0.033 | — | (C) $4.4 \times 10^{-6}$ |
| 44 | 0.09 (W) | 0.070 | 0.032 | — | (C) $1.0 \times 10^{-4}$ |
| 45 | 0.18 (W) | 0.070 | 0.032 | — | (C) $3.7 \times 10^{-4}$ |
| 46 | 0.20 (W) | — | — | 0.034 | (C) $8.6 \times 10^{-5}$ |
| 47 | 0.36 (W) | — | — | 0.001 | (C) $3.4 \times 10^{-4}$ |
| 48 | 0.36 (W) | — | — | 0.017 | (C) $4.0 \times 10^{-4}$ |
| 49 | 0.36 (W) | — | — | 0.017 | * $4.2 \times 10^{-6}$ |
| 50 | 0.005 (M) | — | — | — | (C) $7.6 \times 10^{-7}$ |
| 51 | 0.005 (M) | — | — | — | * $9.0 \times 10^{-7}$ |
| 52 | 0.05 (M) | — | — | — | (C) $4.1 \times 10^{-6}$ |
| 53 | 0.05 (M) | — | — | — | * $1.1 \times 10^{-5}$ |
| 54 | 0.16 (M) | — | — | — | (C) $5.2 \times 10^{-6}$ |
| 55 | 0.16 (M) | — | — | — | * $1.6 \times 10^{-5}$ |
| 56 | 0.16 (M) | 0.070 | — | — | (C) $1.5 \times 10^{-5}$ |
| 57 | 0.16 (M) | — | 0.065 | — | (C) $1.5 \times 10^{-5}$ |
| 58 | 0.16 (M) | — | — | 0.034 | (C) $1.1 \times 10^{-5}$ |
| 59 | 0.05 (M) | 0.070 | 0.065 | — | (C) $3.5 \times 10^{-5}$ |
| 60 | 0.16 (M) | 0.105 | 0.065 | — | (C) $4.9 \times 10^{-5}$ |

(W) : tungstic acid compound  
(M) : molybdic acid compound  
(C) : hydrochloric acid dipping  
(P) : phosphoric acid dipping  
* : alkaline solution dipping

IONIC CONDUCTIVE SOLID ELECTROLYTE, METHOD OF MANUFACTURING THE SAME AND ELECTROCHEMICAL SYSTEM USING THE SAME

BACKGROUND OF THE INVENTION

1. Field of the Invention

The present invention relates to a proton (hydrogen ion) or hydroxide ionic conductive solid electrolyte which is applicable to a fuel cell and the like. The present invention also relates to a method of manufacturing the above-mentioned solid electrolyte and electrochemical systems such as the fuel cell using the above-mentioned solid electrolyte.

2. Description of Prior Art

Electrochemical systems using the proton conduction solid electrolyte have been already put to practical uses for a fuel cell, dehumidifier, or electrolysis apparatus for generating hydrogen. In a solid polymer fuel cell, electric energy are generated by electric current due to an electrochemical oxidization as shown in the reaction formula (1) of hydrogen ($H_2$) supplied to a negative electrode and an electrochemical reduction as shown in the reaction formula (2) of oxygen ($O_2$) supplied to a positive electrode.

$$H_2 \rightarrow 2H^+ + 2e^- \tag{1}$$

$$1/2 O_2 + 2H^+ + 2e^- \rightarrow H_2O \tag{2}$$

Also in a fuel cell using a fuel other than hydrogen ($H_2$) supplied to the negative electrode such as methanol, the fuel is oxidized electrochemically, thereby emitting protons.

As for the electrolysis apparatus, a hydrogen generating apparatus has been put to practical use. The hydrogen generating apparatus generates hydrogen due to the reactions reverse to the reactions as shown in the reaction formulae (1) and (2). The electrolysis hydrogen generating apparatus has an advantage that any hydrogen gas cylinder is not required, because high purity hydrogen is generated merely by supplying water and electric power. Further, the electrolysis hydrogen generating apparatus has another advantage that the solid electrolyte allows pure water (without electrolyte) to be electrolyzed. Further, the electrolysis method is being applied to generating hydrogen peroxide in accordance with the reaction formula (3) for bleaching in the paper manufacturing industry (Electrochemistry, 69, No. 3, 154–159 (2001)).

$$O_2 + H_2O + 2e^- \rightarrow HO_2^- + OH^- \tag{3}$$

In the dehumidifier, the proton conduction solid electrolyte film is put between the positive electrode and negative electrode, similarly in the fuel cell and hydrogen generating apparatus. When a voltage is applied between the positive and negative electrodes, water is electrolyzed to oxygen and proton in accordance with the reaction formula (4) at the positive electrode. The proton which moved through the solid electrolyte to the negative electrode combines with oxygen in the air, thereby generating water, in accordance with the reaction formula (5). Therefore, the humidity at the positive electrode is removed, as a result of movement of the water from the positive electrode to the negative electrode.

$$H_2O \rightarrow 1/2 O_2 + 2H^+ + 2e^- \tag{4}$$

$$1/2 O_2 + 2H^+ + 2e^- \rightarrow H_2O \tag{5}$$

The dehumidification is also possible by electrolyzing water in accordance with the principle similar to that of the electrolysis hydrogen generating apparatus. Further, an air conditioning apparatus in combination with a water evaporation cold air supplier was proposed (Proceeding of the Heisei 12 Institute of Electrical Engineers of Japan National Convention, p 3373 (2000)).

The above-mentioned systems which have been put to practical uses utilize perfluorosulfonic acid ion exchange film represented by the Nafion film. Further, various sensors and electrochromic devices are based on the principles similar to those of the above-mentioned systems, wherein protons moves through the electrolyte between the positive and negative electrodes or oxidization and reduction electrodes. Therefore, the proton conduction solid electrolyte can be utilized. Feasibility of those systems utilizing the proton conduction solid electrolyte are now being studied.

The hydrogen sensor utilizes the change of the electric potential on the electrode due to the hydrogen concentration change. The solid electrolyte of which chief ingredient is, for example, polyvinylalcohol (PVA) was proposed (Sensors and Actuators, 11, 377–386 (1987)). Further, humidity sensor may be fabricated, by utilizing the electric potential change on the electrode or change in the ionic conduction.

The electrochromic device utilizes the coloring of $WO_3$ negative electrode in accordance with the reaction formula (6), when an electric field is applied to the negative electrode. The electrochromic device may be applied to a display device or light shielding glass. Inorganic compound solid electrolyte such as $Sn(HPO_4) \cdot H_2O$ was proposed for the electrochromic device (Bull. Chem. Soc. Jpn., 60, 747–752 (1987)).

$$WO_3 + xH^+ + xe^- \rightarrow H_xWO_3 \text{ (colored)} \tag{6}$$

Other electrochemical systems utilizing proton conduction solid electrolyte are, for example, a primary battery, a secondary battery, a light switch and an electrolyzed water manufacturing apparatus. The nickel hydrogen battery as the secondary battery comprises a hydrogen storage metal alloy for the negative electrode, nickel hydroxide for the positive electrode, and an alkaline solution electrolyte. During the charge and discharge at the negative electrode, the protons are electrochemically reduced and oxidized and hydrogen is stored in the hydrogen storage metal alloy, in accordance with the reaction formulae (7) and (8).

$$\text{(charge) } H_2O + e^- \rightarrow H \text{ (stored)} + OH^- \tag{7}$$

$$\text{(discharge) } H \text{ (stored)} + OH^- \rightarrow H_2O + e^- \tag{8}$$

On the other hand, during the charge and discharge at the positive electrode, the nickel hydroxide is electrochemically oxidized and reduced, in accordance with the reaction formulae (9) and (10).

$$\text{(charge) } Ni(OH) + OH^- \rightarrow NiOOH + H_2O + e^- \tag{9}$$

$$\text{(discharge) } NiOOH + H_2O + e^- \rightarrow Ni(OH) + OH^- \tag{10}$$

Since the charge and discharge reaction of the secondary battery is based on the movement of proton or hydroxide ion, the proton conduction solid electrolyte can be utilized in principle. However, the alkaline solution electrolyte has been conventionally used for the secondary battery.

As for the light switch, yttrium (Y) was proposed for the negative electrode (J. Electrochem. Soc., Vol. 143, No. 10, 3348–3353 (1996)). Light is switched on and off (transmitted or not transmitted) by an electric field, because the Y electrode transmits the light, when the Y electrode is hydrogenated under the application of the electric field in accordance with the reaction formula (11).

$$Y + 3/2 H_2O + 3e^- \rightarrow YH_3 + 3OH^- \tag{11}$$

Although the proton conduction solid electrolyte can be utilized in principle in this system, the alkaline solution electrolyte has been conventionally used.

The electrolyzed water is the water which was electrolyzed and has different effects depending upon whether the water was oxidized or reduced. The electrolyzed water is used for drinking water, food water, cleaning water, or agricultural water, depending upon its good effect to health, sterilization power, cleaning power, or action to promote growth of the crops. Although the electrolysis is accelerated by the electrolyte dissolved in the water, the electrolyte should often be removed from the electrolyzed water, when used. On the contrary, it is not required to remove the electrolyte, when the solid electrolyte is used.

However, the perfluorosulfonic acid electrolyte used conventionally for the fuel cell, the electrolysis hydrogen generating apparatus, or the dehumidifier as the electrochemical system using the proton conduction solid electrolyte has a disadvantage that the manufacturing processes of the perfluorosulfonic acid electrolyte are complicated and the products are expensive. The mass production may lower the product cost, but the cost merit is limited. Therefore, a low cost alternative is being expected.

On the other hand, it should be noted that the alternative solid electrolyte should have a sufficient water-absorbing power, because protons are transported at a high velocity under the action of the water contained in a solid in the proton conduction solid electrolyte operating at the room temperature. Further, it should also be noted that the alternative electrolyte should be water-resistive, because it is used in humid atmosphere. In the conventional perfluorosulfonic acid electrolyte, the water absorbed around the highly hydrophilic sulfonic acid group transports the ion, while the polyfluoroethylene skeletal part maintains the water-resistance, chemical stability and high temperature durability.

One of the low cost and highly hydrophilic hydrocarbon polymer is PVA which is applicable to the hydrogen sensor and the like, if it is made proton-conductive by mixing phosphoric acid. Proton can move at a high velocity, due to a high water absorption of PVA. However, PVA has a disadvantage that it is not stable in the humid atmosphere, due to its dissolution in water.

Other water-resistive and highly hydrophilic materials are inorganic hydrous compounds. For example, a hydrous glass such as $P_2O_5$—$ZrO_2$—$SiO_2$ manufactured by the sol-gel method is highly proton-conductive, due to absorbing a large quantity of water. Further, it does not dissolve in water and is durable at a high temperature which is characteristic of inorganic compound (J. Electrochem. Soc., Vol. 144, No. 6, 2175–2178 (1997)).

However, the inorganic hydrous compounds have a common disadvantage that they are brittle and is difficult to make thin films suitable for the solid electrolyte purpose. Further, they have a disadvantage that the raw material of the sol-gel method is an expensive metal alcoxide, an organic solvent such as alcohol is used in the manufacturing processes. Therefore, it is difficult to manufacture them cheaply even from a point of view of the manufacturing facilities. Although $Sn(HPO_4) \cdot H_2O$ as employed in the electrochromic device is easy to be coated in the form of powder, it is difficult to make a film of $Sn(HPO_4) \cdot H_2O$ which has a gas diffusion suppressing function and high strength which are required for the fuel cell and the like. Further, although molybdophosphoric acid ($H_3MoPO_{40} \cdot 29H_2O$) and tungstophosphoric acid ($H_3WPO_{40} \cdot 29H_2O$) are reportedly highly conductive (Chem. Lett., 17 (1979)), they are also poorly processed.

The hydrophilic organic polymer may be combined with the inorganic compound in order to overcome their respective disadvantages. For example, a proton-conductive material wherein silicon compound is chemically bonded in nanometer range with polyethylene oxide was disclosed in JP 2000-90946 A. Polyethylene oxide is as cheap and hydrophilic as PVA, but itself is dissolved in water. However, it reportedly becomes water-resistive and strong at a high temperature by mixing silicon compound by the sol-gel method. However, the composite material is difficult to be manufactured by any method other than the sol-gel method. Actually, any method other than the sol-gel method is not disclosed. Therefore, the composite material has a disadvantage that the cost of the raw material or the manufacturing cost is not reduced easily. Further, other composite material comprising a silicon compound, an inorganic proton-conductive agent such as tungstophosphoric acid, or molybdophosphoric acid and an organic compound such as polyethyleneoxide manufactured only by the sol-gel method is disclosed in JP 2001-35509 A.

Further, the conventional solid electrolytes are acidic and the electrode and other parts are limited to acid resistant material such as noble metals. Therefore, the electrochemical system as a whole does not become cheap. Further, acidic solid electrolytes make it difficult to develop some of the applications such as a primary battery, secondary battery and light switch, while the alkaline liquid electrolyte conventionally used in the primary and secondary batteries and the like is in danger of leaking outside.

SUMMARY OF THE INVENTION

An object of the present invention is to provide low cost highly ionic conductive solid electrolytes utilizing organic-inorganic composite compound which is water-absorbing as well as water-resistive. Another object of the present invention is to provide electrochemical systems using the highly ionic conductive solid electrolytes.

The highly ionic conductive solid electrolyte of the present invention is a composite compound comprising tungstic acid compound and/or molybdic acid compound and polyvinylalcohol (PVA), and containing water. An aqueous solution dissolving the alkaline metal salt of tungstic acid and/or alkaline metal salt of molybdic acid and PVA is neutralized by an acid. Then, the water as the solvent is removed, and the unnecessary salts are removed, thereby obtaining the composite compound. Further, the electrochemical systems using the electrolyte of the present invention are provided.

The above-mentioned composite compound of tungstic acid compound and/or molybdic acid compound, PVA and water may further contains at least one of phosphoric acid compound, silicic acid compound and boric acid compound. The above-mentioned composite compound is manufactured by the above-mentioned neutralization method, wherein the aqueous solution of the raw material contains at least one alkaline metal salt of phosphoric acid, silicic acid and boric acid. Here, the ratio of the tungstic acid compound weight converted into $WO_3$ weight to PVA weight may be greater than or equal to 0.09, while the ratio of the molybdic acid compound weight converted into $MoO_3$ weight to PVA weight may be greater than or equal to 0.05.

Further, when the composite compound contains at least one of phosphoric acid compound, silicic acid compound and boric acid compound, the ratio of the phosphoric acid compound weight converted into $P_2O_5$ weight to PVA weight may be greater than or equal to 0.003 and preferably greater than or equal to 0.035. The ratio of the silicic acid compound weight converted into $SiO_2$ weight to PVA weight may be greater than or equal to 0.032. The ratio of the boric acid compound weight converted into $B_2O_3$ weight to PVA weight may be greater than or equal to 0.001 and preferably be greater than or equal to 0.017. Further, the ratio of the number of atoms of W or Mo to the total number of atoms of W, Mo, P, Si and B may be smaller than or equal to 30% and preferably be smaller than or equal to 15%.

The above-mentioned composite compounds are dipped in an acid or alkaline solution. Further, the average molecular weight of greater than or equal to 20 wt. % of PVA is smaller than or equal to 26,000, while the saponification degree of greater than or equal to 50 wt. % of PVA is smaller than or equal to 89%.

According to the present invention, the water-absorbing and water-resistive organic-inorganic composite compound is easily manufactured in an aqueous solution method, wherein tungstate and/or molybdate and other salt are neutralized by an acid in that aqueous solution dissolving PVA, then the water as the solvent is removed, and then the unnecessary salts are removed, thereby obtaining the composite compound. Therefore, the low cost highly ionic conductive solid electrolytes are provided and the electrochemical systems utilizing them is provided.

It is not correct to understand that mere polycondensation of tungstic acid and/or molybdic acid occur during the neutralization in the aqueous solution of tungstate and/or molybdate. The polycondensation occurs in such a manner that PVA is entwined and combined in microscopic level with the polycondensed tungstic acid and/or molybdic acid and other compounds from added salts. The polycondensation is accelerated by heating, thereby obtaining strong and soft composite compounds which is easy to be processed to a thin film. The composite compounds are not dissolved in hot water and maintain stably their physical characteristics even in high temperature high humidity environment, due to the hydrogen bond or dehydropolycondensation between tungstic acid compound and/or molybdic acid compound, other compounds from added salts and PVA (which per se normally dissolves in hot water). Further, the composite compounds can absorb a large quantity of water in spite of being water-resistive, thereby becoming highly ionic conductive. This is because PVA, tungstic acid compound and/or molybdic acid compound are highly hydrophilic. Thus, the water contained in the composite compound comprising PVA and tungstic acid compound and/or molybdic acid compound help proton or hydroxide ion to diffuse at a high velocity.

Further, phosphoric acid compound, silicic acid compound, or boric acid compound is easily taken into the composite compound, either by dissolving phosphate, silicate, or borate in aqueous solution of the raw material of PVA and tungstate or molybdate, or by adding phosphoric acid or boric acid into aqueous solution of the raw material at the neutralizing process. The characteristics of the composite compounds are improved by the third and forth components. For example, the ionic conductivity thereof is maintained or raised. Further, the cost of the composite compounds are reduced, because the quantity of tungstate and/or molybdate, which are expensive element, is reduced by the introduction of the third and forth components. Furthermore, a large quantity of tungstic acid compound, molybdic acid compound, phosphoric acid compound, silicic acid compound, and boric acid compound are combined uniformly with PVA by adding low molecular weight PVA, thereby also improving the characteristics of the resultant composite compound. The ionic conductivity of the composite compound in the alkaline form is also high.

The highly ionic conductive solid electrolytes of the present invention can be applied to various electrochemical systems such as a fuel cell, steam pump, dehumidifier, air conditioner, electrochromic device, electrolysis hydrogen generating apparatus, electrolysis hydrogen peroxide generating apparatus, electrolysis water generating apparatus, humidity sensor, hydrogen sensor, primary battery, secondary battery, light switch, and novel battery with multivalent metals. Further, the highly ionic conductive solid electrolytes of the present invention can contribute to reduce the cost of those electrochemical systems. Particularly, cost of the materials of the members around the electrodes used in those electrochemical systems can be reduced by using the alkaline form electrolyte.

BRIEF EXPLANATION OF THE DRAWINGS

FIG. 1 is a table of the ionic conductivity of the composite compounds of samples No. 1 to 27.

FIG. 2 is a table of the ionic conductivity of the composite compounds of samples No. 28 to 60 which are dipped in an acid or alkaline solution.

PREFERRED EMBODIMENTS OF THE INVENTION

The preferred embodiments of the present invention are explained, referring to the drawings. The present invention is not limited to the embodiments disclosed herein, while the present invention is capable of further modification following the principle of the invention and within known or customary practice in the art.

Embodiment 1

Electrolyte films were obtained by a neutralization reaction in a raw material aqueous solution of prescribed quantity of sodium tungstate and/or sodium molybdate dissolved in 80 cc aqueous solution of 2 wt. % mixture of 50 wt. % polyvinylalcohol (PVA) of which average molecular weight was 120,000 to 190,000 and saponification degree was 87 to 89% and 50 wt. % PVA of which average molecular weight was 18,000 to 26,000 and saponification degree was 100%. The raw material aqueous solution was stirred and was neutralized by dropping 1.2 M concentration hydrochrolic acid until the pH of the raw material aqueous solution becomes "1". Then, the raw material aqueous solution was poured into two schales of 90 mm in diameter and was dried at 50° C., thereby removing water as a solvent. Films left on the schales after drying were peeled off and were heated at 100° C. for 3 hours in the air in an oven. Then, the films were washed in 70 to 80° C. hot water.

The samples No. 1 to No. 4 and No. 20 to No. 22 are thus obtained, as shown in FIG. 1, wherein the tungstic acid compound (denoted by W) weight and/or molybdic acid compound (denoted by M) weight is converted into $WO_3$ weight or $MoO_3$ weight and the ratio of the converted weight to PVA weight is shown.

Hereinafter, it should be understood that at least one of tungstic acid compound or molybdic acid is used for the electrolyte of the present invention.

Among these samples, the composite compound containing the tungstic acid compound of greater than or equal to 0.09 in the converted ratio and the composite compound containing the molybdic acid compound of greater than or equal to 0.05 in the converted ratio are not dissolved, even after being washed in 70° C. hot water for 1 hour, maintain the film shapes, and therefore are superior in the water-resistivity. On the contrary, pure PVA film manufactured in the similar way is soon dissolved in the hot water. Therefore, it is proved that introduction of the tungstic or molybdic acid compound in PVA allows the water-resistivity of PVA to raise up.

The ionic conductivity of each sample is measured by cutting the film in 30 mm diameter circle which is put between two platinum circle plates of 28 mm diameter and two brass circle plates placed outside the platinum plates, thereby fixing the sample by insulated clips. The response of current and phase angle is measured by connecting the lead wires from the brass plates with the LCR meter which generates 10 mV alternating voltage of 5 MHz to 50 Hz, thereby obtaining the ionic conductivity on the basis of a diameter of a half circle of the Cole-Cole plot which is generally used. The sample is introduced during the measurement in a high temperature high humidity bath at 50° C. at 90% relative humidity. The measurement result is shown in FIG. 1.

The ionic conductivities of the samples containing tungsten such as samples No. 1 of which $WO_3$ converted ratios are smaller than or equal to 0.09 are as low as $10^{-6}$ S/cm (siemens/cm) order, while the ionic conductivities of the samples containing tungsten as samples No. 2 to No. 4 of which $WO_3$ converted ratios are greater than or equal to 0.36 are as high as $10^{-5}$ S/cm order, even when the proton sites are not completely protonated. On the other hand, although the ionic conductivities in the molybdenum containing samples are not generally higher than those in the tungsten containing samples, the samples No. 20 to No. 27 containing molybdic acid compound greater than or equal to 0.05 in the converted ratio have the ionic conductivities of $10^{-6}$ S/cm.

The samples No. 5 to 19 and No. 23 to 27 are obtained by using the raw material aqueous solution which further contains tertiary sodium phosphate, sodium silicate, sodium borate.

Here, the weight of these additives are converted into the weight of $P_2O_5$, $SiO_2$ and $B_2O_3$, respectively, and the converted ratio, in other words, the ratio of the converted weight of each additives to the weight of PVA, is shown in FIG. 1. As shown in FIG. 1, the ionic conductivities of the samples containing tungsten such as the samples No. 5 to 19 added by the phosphoric acid compound, silicic acid compound, or boric acid compound are as high as $10^{-5}$ to $10^{-4}$ S/cm (siemens/cm) order. Particularly, the tungsten containing samples with phosphoric acid compound of the converted ratio of greater than or equal to 0.003 and the tungsten containing samples with boric acid compound of the converted ratio of greater than or equal to 0.001 have higher ionic conductivities greater than those of the tungsten containing samples without any phosphoric or boric acid compound. Further, particularly, the tungsten containing samples with the phosphoric acid compound of greater than or equal to 0.035 converted ratio or with the boric acid compound of greater than or equal to 0.017 converted ratio have particularly high ionic conductivities. In short, the samples containing tungstic acid compound of greater than or equal to 0.09 converted ratio can maintain by those additives a high ionic conductivity of $10^{-5}$ S/cm order, while the samples containing tungstic acid compound of smaller than or equal to 0.09 converted ratio have a low ionic conductivity of $10^{-6}$ S/cm order, even by adding those additives.

As for the molybdenum containing samples, the samples No. 23 to No. 26 raise up their ionic conductivities, when any one of the phosphoric acid compound, silicic acid compound or boric acid compound is added.

Embodiment 2

The electrolyte films of the Embodiment 1 as shown in FIG. 1 were further dipped either in acid solution in order to promote protonation, or in alkaline solution in order to promote alkalization. The results of the protonation and alkalization are shown in FIG. 2. During the acid dipping, the electrolyte films were dipped for 3 hours in 1.2 M concentration hydrochloric acid or 8.5 wt. % concentration phosphoric acid and then the films were washed sufficiently. On the other hand, during the alkali dipping, the electrolyte films were dipped for 3 hours in 0.02 M concentration sodium hydroxide and then, the films were dried without washing and their surfaces were wiped.

In FIG. 2, the hydrochloric acid dipping is denote by(C), the phosphoric acid dipping is denoted by (P) and the alkai dipping is denoted by (*).

The ionic conductivities of tungsten containing samples dipped in the acid solution such as No. 28 to 49 are remarkably raised up by the acid dipping. Particularly, the ionic conductivities of the samples containing the tungstic acid compound $\geq 0.09$ become as high as $10^{-4}$ S/cm, by adding phosphoric acid compound, silicic acid compound, or boric acid compound. However, the ionic conductivities of the samples containing the tungstic acid compound $\leq 0.09$ still remains as low as $10^{-6}$ S/cm order. Further, the sample No. 44 proved that a sufficiently high ionic conduction can be maintained, when the atomic (number) % of W in the total number of atoms of W, P, Si, B is greater than or equal to 15%. The W at. % is preferably greater than or equal to 30 at. % for a higher conductivity, as shown by the sample No. 45.

As for the molybdenum containinng samples dipped in the acid solution, the ionic conductivities of the samples such as No. 50 to 60 are improved, but the result was not so remarkable as the tungsten containing samples. Further, the sample No. 59 proved that a sufficiently high ionic conduction can be maintained, when the atomic (number) % of Mo in the total number of atoms of Mo, P, Si, B is greater than or equal to 15%. The Mo at. % is preferably greater than or equal to 30 at. % for a higher conductivity, as shown by the sample No. 60.

When the samples were dipped in the alkaline solution, the ionic conductivities of the tangsten containing samples were lowered to $10^{-6}$ S/cm order, although they were proved to be still useful for the alkaline electrolyte. On the contrary, the alkali dipped molybdenum containing samples showed ionic conductivities of $10^{-5}$ S/cm order which are higher than those of the acid solution dipped molybdenum containing samples. From the similarity of the conductivities between the alkali dipped samples and the acid dipped samples, it can be considered that the rapid diffusion of proton is dominative than the diffusion of alkaline metal, even in the alkali dipped samples, similarly in the acid dipped samples. Further, not-shown experiments by dipping in potassium hydroxide or lithium hydroxide leaded to the results similar to the above-mentioned results.

Embodiment 3

An effect of heating condition on the samples as shown in FIG. 1 is explained. Although the sample films were heated at 100° C. for 3 hours in the air in the oven in the Embodiment 1, the same composition sample as the sample No. 9 (only phosphoric acid compound was added) was manufactured in accordance with the manufacturing method as explained in the Embodiment 1, except that the heat condition was changed from 100° C. for 3 hours to 80° C. for 6 hours. However, the film was remarkably weakened by washing in the hot water and could not maintain its film shape. On the other hand, the same composition sample as the sample No. 15 (phosphoric acid compound and silicic acid compound were added) was manufactured in accordance with the manufacturing method as explained in the Embodiment 1, except that the heat condition was changed from 100° C. for 3 hours to 50° C. for 10 hours. The film was strong enough to be washed and to maintain its film shape. Therefore, it can be considered from these results that the heat treatment temperature is in general preferably greater than or equal to 100° C., while it may be lower than 100° C., when the silicic acid compound is added in the sample.

Embodiment 4

An effect of polymerization degree (molecular weight) of PVA on the samples as shown in FIG. 1 is explained. The same composition sample as sample No. 9 was manufactured in accordance with the manufacturing method as explained in the Embodiment 1, except that three different composition of PVA were employed. The first PVA composition is a mixture of 80 wt. % PVA of which average molecular weight was 120,000 to 190,000 (high molecular weight) and saponification degree was 87 to 89% and 20 wt. % PVA of which average molecular weight was 18,000 to 26,000 (low molecular weight) and saponification degree was 100%. The second PVA composition was a mixture of 10 wt. % PVA of which average molecular weight was 120,000 to 190,000 (high molecular weight) and saponification degree was 87 to 89% and 90 wt. % PVA of which average molecular weight was 18,000 to 26,000 (low molecular weight) and saponification degree was 100%. The third PVA was of the average molecular weight 120,000 to 190,000 (high molecular weight) and saponification degree 87 to 89%. The forth PVA was of the average molecular weight 12,000 to 19,000 and saponification degree 100%.

The experimental results showed that the ionic conductivity does not depend so much upon the concentration of the low molecular weight (18,000 to 26,000) PVA, while the film without the low molecular weight PVA is not partly uniform in such a manner that it is partly opaque due to crystallization and further the film with the low molecular weight PVA $\geq$20 wt. % is hardly found not to be uniform. There were aggregated disposal salts in the crystallized parts of the film and those parts became thinner or holes were made in those parts. The above-mentioned disadvantageous lack of uniformity in the film could be prevented by adding the low molecular weight PVA. However, when the low molecular weight PVA is contained by greater than or equal to 90 wt. %, the composite compound film became brittle. Further, the forth PVA of the average molecular weight 12,000 to 19,000 and saponification degree 100% caused the lack of uniformity and low ionic conduction. Therefore, it is desirable that PVA of the saponification $\leq$89% is contained by a concentration $\geq$50 wt.

PVA is not necessarily perfect, but has only to function as PVA. Therefore, even PVA wherein a part of hydroxyl bases is replaced by other base, or PVA wherein other polymers are copolymerized with a part of itself can be utilized. Further, polyvinyl acetate which is a raw material of PVA can be utilized.

As far as the materials do not prevent the function of PVA, the following materials may be added; polyethylene, polyolefin and its derivatives such as polypropylene, polyacrylic acid and its derivatives, polyethyleneoxide, polyether and its derivatives such as polypropyleneoxide, polytetrafluoroethylene, fluorine polymer and its derivatives such as polyvinylidene fluoride, polysaccharide and its derivatives such as methyl cellulose, polyvinyl acetate and its derivatives, polystyrene and its derivatives, polycarbonate and its derivatives, epoxy resin and its derivatives, and all those materials with organic or inorganic additives.

Other Embodiments

The alkaline metal salt of tungstic or molybdic acid has only to be soluble in water, regardless of the kind of alkaline metal salt and the concentration of alkaline metal ion, tungsten, molybdenum, oxygen and water.

Although the solvent of the raw material aqueous solution used in the present invention is essentially water, other solvent of which concentration is lower than the water may be added. Further, the phosphoric acid compound, silicic acid compound, and boric acid compound may be added in order to raise the ionic conductivity and to facilitate a low temperature heat treatment. The phosphoric acid compound, silicic acid compound, and boric acid compound are added by dissolving the alkaline metal salts of the phosphoric acid, silicic acid, and boric acid in the raw material aqueous solution. Here, any of the primary, secondary and tertiary phosphate can be used, the primary phosphate is not desirable, because the primary phosphate neutralizes, soon after it is introduced into the raw material aqueous solution, the silicate, or borate if any.

Any silicate and borate can be used, regardless of the kind and concentration of alkaline metal ion and the water concentration. For example, the water-glass can be used. Two or more salts can be mixed. Further, the compounds of a group of tungstic or molybdic acid and a group of phosophoric, silicic, or boric acid may be used. Concretely, the salts of the heteropoly acid (such as tungstophosphoric acid, molybdophosphoric acid, silicotangstic acid, silicomolybdic acid, tungstoboric acid, molybdoboric acid) can be used.

The acid added to the raw material aqueous solution has only to neutralize the tungstate or molybdate. Therefore, hydrochloric acid, sulfuric acid, phosphoric acid and other acid may be used. Further, phosphoric or boric acid compound can be introduced into the composite compound by adding the phosphoric or boric acid to the acid for the neutralization reaction. The neutralization reaction may be started either by adding the acid to the raw material aqueous solution, or by adding the raw material aqueous solution to the acid. Before the neutralization, PVA may be contained either in the raw material, or in the acid, because the neutralization has only to occur in a state wherein tungstate or molybdate and PVA are dissolved with each other.

Water as the solvent is removed, by heating and drying, from the raw material aqueous solution neutralized by the acid, thereby obtaining products in desirable forms and shapes such as a thin film and so on. The obtained products are then heat-treated at a temperature higher than or equal to 100° C. in order to promote the polycondensation of tungstic or molybdic acid compound itself, bonding of tungstic or molybdic acid compound with the phosphoric acid compound, silicic acid compound, boric acid compound and PVA, thereby improving the strength, water-resistivity and high temperature stability. If the heat treatment is not conducted, the strength is lowered in hot water and other problems are caused. Heat treatment may be conducted in the air, inert gas atmosphere, or vacuum. However, particularly, the sample containing the silicic acid compound $\geq 0.032$ in the converted ratio to PVA becomes sufficiently water-resistive even by a temperature $\leq 100°$ C.

The unnecessary salts in the composite compound are washed out by a solvent such as water before or after the heat treatment, because the unnecessary salts, or in other words, free anions which are introduced into the composite compound by the acid for the neutralization reaction and are not fixed to the electrolyte exert a bad influence upon the oxidization and reduction reaction which occur at the electrodes in the electrochemical systems using the electrolyte.

The W, Mo, P, Si, B converted ratio is defined by the ratio of the weight of the tungstic, molybdic, phosphoric, silicic, or boric acid compound which is converted into the weight of $WO_3$, $MoO_3$, $P_2O_5$, $SiO_2$, or $B_2O_3$ to the weight of PVA (polyvinylalcohol).

The W converted ratio is preferably greater than or equal to 0.09, while the Mo converted ratio is preferably greater than or equal to 0.05. Otherwise the ionic conductivities of the composite compounds do not become sufficiently high.

For making an acid type proton conduction solid electrolyte, the proton sites in the composite compound are completely protonated by dipping the composite compound in an acid, thereby increasing the proton concentration and raising the ionic conductivity. Any acid can be used, as far as it is suitable for the protonation. For example, hydrochloric acid, sulfuric acid, phosphoric acid and so on can be used. The acid dipping is more effective for the tungstic acid compound than for the molybdic acid compound. Further, the dipping solution is not necessarily an aqueous solution.

On the other hand, for making an alkali type proton conduction solid electrolyte, or alkali type hydroxide ionic conduction solid electrolyte, the composite compound is completely alkalized by dipping it in an alkaline solution, thereby raising the ionic conductivity. Any alkali can be used, as far as it is suitable for the alkalization. For example, sodium hydroxide, potassium hydroxide, lithium hydroxide and so on can be used. The alkali dipping is more effective for the molybdic acid compound than for the tungstic acid compound. Further, the dipping solution is not necessarily an aqueous solution.

The P converted ratio is preferably greater than or equal to 0.003, or more preferably greater than or equal to 0.035, in order to obtain a high ionic conductivity, while the B converted ratio is preferably greater than or equal to 0.001, or more preferably greater than or equal to 0.017, in order to obtain a high ionic conductivity. Further, the Si converted ratio is preferably greater than or equal to 0.032, thereby maintaining the hot water resistivity of the electrolyte, even under the heat treatment at a temperature $\leq 100°$ C. Further, the addition of the phosphoric acid compound, silicic acid compound, or boric acid compound reduces the quantity of the tungstic or molybdic acid compound which is costliest, thereby reducing the cost of the electrolyte, because the ionic conductivity is sufficiently high, when the W or Mo at. % which is defined by the atomic number ratio (at. %) of W or Mo to the total atomic number of W, Mo, P, Si, B is smaller than or equal to 30 at. %. The ionic conductivity is still high, even when the W or Mo at. % is smaller than or equal to 15 at. %.

The addition of PVA with a molecular weight $\leq 26,000$ prevents the partial crystallization and produces a uniform composite compound. However, when PVA with a molecular weight $\leq 26,000$ is greater than or equal to 90 wt. % in PVA as a whole, the composite compound becomes brittle. The ionic conduction is made high, when PVA with a saponification degree $\leq 89\%$ is greater than or equal to 50 wt. % in PVA as a whole.

The alkali metal ion introduced in the proton site in the composite compound allows the electrolyte to become an alkali form which is highly proton-conductive, or highly hydroxide ion conductive. Particularly, the alkali form molybdic acid compound make it feasible to use cheap materials such as Ni as electrodes and other system parts, thereby reducing the cost of an electrochemical system as a whole.

The alkaline solid electrolyte replaces the conventional alkaline solution electrolyte of the primary and secondary battery, thereby preventing leaking out of the conventional alkaline solution electrolyte and making it possible to put to practical use a high energy density secondary battery desired for a long time wherein the negative electrode is made of a multivalent metal, for example, a nickel zinc secondary battery wherein the negative electrode is made of zinc oxide and the positive electrode is made of nickel hydroxide (as in the case of the conventional nickel hydrogen battery). In the nickel zinc battery, the zinc oxide is reduced to a metal zinc during charging as shown in the reaction formulae (12) and (13), while the zinc is oxidized electrochemically during discharging.

$$ZnO+H_2O+2e^- \rightarrow Zn+2OH^- \quad (12)$$

$$Zn+2OH^- \rightarrow ZnO+H_2O+2e^- \quad (13)$$

Although the nickel zinc battery has a high energy density, it has a disadvantage that the zinc ions elude from the Zn electrode due to the easy dissolution of ZnO into the alkaline solution electrolyte and that the needle metallic zinc (dendrite) produced during the reduction of the eluded zinc ions passes through the separator and causes a short circuit. Further, the nickel zinc battery has another disadvantage that the zinc is easily self-discharged by the oxidization of the zinc by water after finishing charging due to the fact that the oxidization-reduction potential of zinc is lower than hydrogen and the charging efficiency is lowered by the hydrogen generation from the zinc electrode during charging. Therefore, it is difficult to put to practical use the nickel zinc battery using the liquid electrolyte. On the contrary, the nickel zinc battery using the solid electrolyte of the present invention has an advantage that the elusion of the zinc ion is suppressed, the dendrite is hardly produced due to the slow diffusion of the zinc ion from the zinc electrode and the solid electrolyte itself hardly passes from the negative electrode to the positive electrode, even if the dendrite is produced. Further, the nickel zinc battery using the solid electrolyte of the present invention has another advantage that the self-discharging at the metal electrode of which oxidization-reduction potential is lower than hydrogen hardly occurs because of the poor activity of the water in the solid electrolyte and that the charging efficiency is improved, because the electrolysis of water, or the reduction of proton which is competitive to the reduction of metal hardly occurs. The above-mentioned suppression of the elusion and diffusion of the metal ion and production of the dendrite is also effective for the primary battery as well as the air-zinc secondary battery wherein the positive electrode is the air and the diffusion of oxygen to the zinc electrode is suppressed.

It is possible to put to practical use a secondary battery using other multivalent metal such as Cu, Co, Fe, Mn, Cr, V, Sn, Mo, Nb, W, Si, B, or Al.

Although the alkali solution electrolyte soaked in a porous separator is used in the conventional alkali secondary battery such as the nickel hydrogen battery, the electrolyte of the present invention functions both as an electorlyte and a separator. Therefore, due to the present invention, the solution electrolyte is not required or reduced greatly, thereby improving the energy density of battery. Further, the short circuit is effectively prevented, even in a form of thin film, unlike in the porous separator. Therefore, a large area thin film electrode can be employed, according to the present invention.

The raw materials of the solid electrolyte manufactured by aqueous solution process of the present invention are far more cheaper than the conventional perfluorosulfonic acid electrolyte. Further, the electrolyte of the present invention is soft and easy to process, unlike the inorganic solid materials. Further, the employment of PVA makes it possible to easily manufacture a low cost composite compound by the aqueous solution process, unlike by the costly sol-gel method applied to the conventional composite compound employing polyethyleneoxide to which the aqueous solution process of the present invention can not be applied.

What is claimed is:

1. A method for manufacturing an ionic conductive solid electrolyte which is a composite compound of a tungstic and/or molybdic acid compound, polyvinylalcohol and water, which comprises the steps of:
    making an aqueous solution dissolving an alkaline salt of a tungstic and/or molybdic acid and polyvinyl alcohol;
    neutralizing said aqueous solution by an acid; and
    removing an unnecessary salt produced by the neutralization.

2. The method for manufacturing an ionic conductive solid electrolyte according to claim 1, wherein said composite compound is heated at a temperature greater than or equal to 100° C., before or after removing said unnecessary salt.

3. The method for manufacturing an ionic conductive solid electrolyte according to claim 1, wherein said aqueous solution further comprises at least one of alkaline metal salts of phosphoric acid, silicic acid and boric acid and said composite compound further comprises at least one of a phosphoric acid compound, silicic acid compound and boric acid compound.

4. The method for manufacturing an ionic conductive solid electrolyte according to claim 1, wherein said composite compound is dipped in an acid solution.

5. The method for manufacturing an ionic conductive solid electrolyte according to claim 1, wherein said composite compound is dipped in an alkaline solution.

6. An electrochemical system, comprising:
    electrodes;
    an ionic conductive solid electrolyte operatively associated with said electrodes; and
    said electrolyte containing a composite compound comprising a tungstic acid and/or molybdic acid compound, polyvinylalcohol and water, wherein a ratio of the weight of said tungstic acid converted into the weight of $WO_3$ to the weight of said polyvinylalcohol is greater than or equal to 0.09, and/or a ratio of the weight of said molybdic acid compound converted into the weight of $MoO_3$ to the weight of said polyvinylalcohol is greater than or equal to 0.05.

7. The electrochemical system according to claim 6, wherein said electrochemical system is selected among a fuel cell, steam pump, dehumidifier, air conditioning apparatus, electrochromic device, electrolysis apparatus, electrolysis hydrogen generating apparatus, electrolysis hydrogen peroxide generating apparatus, electrolysis water generating apparatus, humidity sensor, hydrogen sensor, primary battery, secondary battery, light switch, or battery with mulivalent metal.

8. The electrochemical system according to claim 6, wherein said composite compound further comprises at least one of phosphoric acid compound, silicic acid compound, and boric acid compound.

9. The electrochemical system according to claim 8, wherein a ratio of the weight of said phosphoric acid compound converted into the weight of $P_2O_5$ to the weight of said polyvinylalcohol is greater than or equal to 0.003.

10. The electrochemical system according to claim 8, wherein a ratio of the weight of said phosphoric acid compound converted into the weight of $P_2O_5$ to the weight of said polyvinylalcohol is greater than or equal to 0.035.

11. The electrochemical system according to claim 8, wherein a ratio of the weight of said silicic acid compound converted into the weight of $SiO_2$ to the weight of said polyvinylalcohol is greater than or equal to 0.032.

12. The electrochemical system according to claim 8, wherein a ratio of the weight of said boric acid compound converted into the weight of $B_2O_3$ to the weight of said polyvinylalcohol is greater than or equal to 0.001.

13. The electrochemical system according to claim 8, wherein a ratio of the weight of said boric acid compound converted into the weight of $B_2O_3$ to the weight of said polyvinylalcohol is greater than or equal to 0.017.

14. The electrochemical system according to claim 8, wherein an atomic number ratio in % of W or Mo to the total atomic number of W, Mo, P, Si and B is smaller than or equal to 30%.

15. The electrochemical system according to claim 8, wherein an atomic number ratio in % of W or Mo to the total atomic number of W, Mo, P, Si and B is smaller than orequal to 15%.

16. The electrochemical system according to claim 6, wherein an average molecular weight of greater than or equal to 20 wt. % of said polyvinylalcohol is smaller than 26,000.

17. The electrochemical system according to claim 6, wherein a saponification degree of greater than or equal to 50 wt. % of said polyvinylalcohol is smaller than 89%.

* * * * *